United States Patent
Cain et al.

(10) Patent No.: US 6,410,078 B1
(45) Date of Patent: Jun. 25, 2002

(54) TRIGLYCERIDES, RICH IN POLYUNSATURATED FATTY ACIDS

(75) Inventors: Frederick William Cain, Voorburg (NL); Gerald Patrick McNeill, Rushden; Stephen Raymond Moore, Thrapston, both of (GB)

(73) Assignee: Loders-Croklaan B.V., Wormerveer (NL)

( * ) Notice: Subject to any disclaimer, the term of this patent is extended or adjusted under 35 U.S.C. 154(b) by 0 days.

(21) Appl. No.: 09/998,179

(22) Filed: Dec. 3, 2001

Related U.S. Application Data

(63) Continuation of application No. 08/638,742, filed on Apr. 29, 1996, now abandoned.

(30) Foreign Application Priority Data

Apr. 28, 1995 (EP) .............................. 95302942

(51) Int. Cl.⁷ ................................. A23D 9/00
(52) U.S. Cl. ...................... 426/606; 426/607; 554/223; 554/224; 554/227
(58) Field of Search ................. 426/606, 607; 554/224, 225

(56) References Cited

U.S. PATENT DOCUMENTS

| | | | |
|---|---|---|---|
| 5,151,291 A | | 9/1992 | Tokairin et al. |
| 5,756,143 A | * | 5/1998 | Cain et al. .................. 426/606 |
| 5,908,654 A | * | 6/1999 | Cain et al. .................. 426/603 |
| 6,143,348 A | * | 11/2000 | Cain et al. .................. 426/601 |

FOREIGN PATENT DOCUMENTS

| | | |
|---|---|---|
| EP | 0 265 699 | 5/1988 |
| EP | 0 298 293 | 1/1989 |
| EP | 0 609 001 A2 | 8/1994 |
| WO | WO 91/09597 | 7/1991 |
| WO | WO 94/24889 | 11/1994 |
| WO | WO94/24889 | * 11/1994 |

OTHER PUBLICATIONS

Sridhar, R. & Lakshminarayana, Incorporationof Eicosapentaenoic and . . . , JAOCS, Oct., 1992.
Patent Abstract of Japan, Aug. 10 1993, 05 095792.
Derwent Publication, 05 255 692, Oct 1993.
Toyoshima et al., J. of the Japan Oil Chemists'society, vol. 42, No. 1 pp. 30–35 (1993).
Endo et al., Bioscience Biotechnology Biochemistry, vol. 57, No. 12, pp. 2202–2204 (1993).
Pedersen et al., JAOCS, vol. 72, No. 2, pp. 239–243 (1995).
Tanaka et al., JAOCS, vol. 71, No. 3, pp. 331–334 (1994).
Adachi et al., J. of Fermentation and bioengineering, vol. 75, No. 4, pp. 259–264 (1993).

* cited by examiner

*Primary Examiner*—Carolyn Paden
(74) *Attorney, Agent, or Firm*—Morgan, Lewis & Bockius LLP

(57) ABSTRACT

Triglycerides, that have at least two long chain polyunsaturated fatty acids $L_1$ and $L_2$, from which at least one is present for more than 20 wt %, while the weight ratio $L_1:L_2$ is at least 2 and which triglycerides also contain at least 2 wt % of saturated fatty acids with 2–12 and/or 20–24 C-atoms, but not more than 10 wt % of saturated fatty acids with 16-18 C-atoms, while at least 5 wt % of the saturated $C_2$–$C_{12}$ or $C_{20}$–$C_{24}$ fatty acid residues is bonded on a triglyceride molecule, wherein at least $L_1$ and/or $L_2$ is present, display a number of advantageous properties (e.g. higher oxidative stability, healthier, lower caloric, structuring properties, digestibility).

10 Claims, No Drawings

TRIGLYCERIDES, RICH IN POLYUNSATURATED FATTY ACIDS

This is a Continuation of National application Ser. No. 08/638,742 filed Apr. 29, 1996, now abandoned.

BACKGROUND OF THE INVENTION

According to EP 265 699 fats with a superior digestibility and absorptivity are obtained, when these fats are composed of triglycerides having a specific amount of $C_8$ to $C_{14}$ fatty acid residues at the 2-position, while residues with $C_{18}$ or higher fatty acids are bonded at the 1.3-positions. Typical examples of the $C_{18}$ and higher fatty acids are polyunsaturated fatty acids, such as arachidonic acid, eicosapentenoic acid and dodecahexenoic acid. However nothing is disclosed about fat compositions that combine in the fat saturated fatty acid residues and at least two different long chain polyunsaturated fatty acid residues. In WO 90/04012 it is disclosed that triglycerides that contain saturated $C_8/C_{10}$ fatty acid residues in 1.3 and simultaneously a polyunsaturated fatty acid residue (in particular DHA) in the 2-position, have beneficial nutritional properties, in particular for enteral or parenteral purposes. However again, nothing is disclosed about fat compositions that contain in the fat specific amounts of saturated and two different polyunsaturated fatty acid residues.

From WO 94/00044 it is known that fatblends that contain unhardened fish oil have significant health benefits. Fish oil often contains appreciable amounts of two different polyunsaturated fatty acids, e.g. DHA and EPA. However it is also known that fish oil has a number of draw backs, such as a low oxidative stability (e.g. noticed as off taste during storage at ambient temperature). Further fish oils do not have structuring properties, which makes it difficult to apply them in fat compositions wherein a structuring agent is required in order to give the fat composition a performance, that is desired to make the fat applicable in foodproducts.

From Endo c.s in Bioscience Biotechn. Biochem. 57 (12) 1993 pages 2202–2024 it is known, that incorporation of myristic acid groups into sardine oil leads to a product with a slightly improved oxidation rate, whereas incorporation of stearic acid in the sardine oil hardly had any effect on the oxidation rate. This incorporation of saturated fatty acid is performed by an enzymic process, applying Candida cylindracea or lypozyme as an enzyme. It is taught that starting from sardine oil with about 8% DHA and 12% EPA, products are obtained with a decreased amount of total long chain polyunsaturated fatty acids (about 11% if $C_{14:0}$ was incorporated and about 17.5% if stearic acid was incorporated).

Therefore, above document does not disclose triglycerides that contain at least 20 wt % of a most abundant long chain polyunsaturated fatty acid in combination with at least 2% of saturated $C_2$–$C_{12}$ or $C_{20}$–$C_{24}$ fatty acids.

U.S. Pat. No. 5,151,291 discloses triglycerides that are rich in EPA and that also contain "higher fatty acid residues". The higher fatty acid residues are defined as saturated fatty acid with at least 14 C-atoms, but also DHA could be considered as such. The products obtained must combine a high EPA level with a high melting point in order to make them suitable as margarine fat. Because of above requirements the triglyceride products never will combine levels of a most abundant long chain polyunsaturated fatty acid of more than 20% with the presence of a second most abundant long chain polyunsaturated fatty acid in a ratio between these two LCPUFA's of more than 2, while also at least 2% saturated $C_2$–$C_{12}$ or $C_{20}$–$C_{24}$ fatty acid will be present in these triglycerides.

We have performed a study to find out, whether fat compositions existed, that could overcome the draw backs of the known fat compositions, while they would retain the beneficial effects of the presence of relatively high amounts of polyunsaturated fatty acids. This study has resulted in the finding of novel fats, that combine the following beneficial product properties:

- our novel fats display better oxidative stability than triglycerides with similar compositions, however not having our levels of saturated fatty acids present;
- our novel fats are better for the development of the brain, in particular when consumed by infants. This effect is due to the relatively high levels of dodecahexenoic acid (DHA) in our fats;
- our novel fats also can contain relatively high levels of eicosapentenoic acid (EPA), which makes our fats healthier, due to the effect of EPA on coronary diseases;
- our novel fats display a lower calorific behaviour. This is due to the presence of the short chain saturated fatty acid, which will decrease the molecular weight of our fats and thereby will decrease simultaneously its caloric contents. Fats, that contain long chain saturated fatty acids, such as behenic acid, display a reduced fat absorption by the body and thus display a decreased digestibility;
- our novel fats display better structuring properties than fats without the saturated fatty acids;
- our novel fats can be obtained as a result of interesterification reactions, in particular enzymic interesterification, which results in fats with a better triglyceride-distribution than known fats. Simultaneously these fats will display an improved melting behaviour as our fats will hardly contain any trisaturated triglycerides.
- our interesterified fats will also give better digestion of polyunsaturated fatty acids because, as a result of the interesterification with short or medium chain fatty acids tripolyunsaturated triglycerides will be hardly present in our fats.

SUMMARY OF THE INVENTION

So our inventions concerns with novel fats, that display one or more of above beneficial effects. Our novel fats can be described as a triglyceride-composition, comprising at least two long chain poly-unsaturated fatty acids $L_1$ and $L_2$, both having at least 3 unsaturations and having at least 20 carbon atoms from which $L_1$ is the most abundant and $L_2$ is the second most abundant, wherein the triglyceride composition contains at least 20 wt % of $L_1$, while the weight ratio $L_1:L_2$ is at least 2, and the triglyceride composition also contains at least 2 wt % preferably at least 5 wt %, more preferably at least 15 wt %, most preferably at least 30 wt % of saturated fatty acids with 2–12 and/or 20–24 carbon atoms, whereas the triglyceride composition does not contain more than 10 wt % of saturated fatty acids with 16–18 carbon atoms, while at least 5 wt % of the saturated $C_2$–$C_{12}$ or $C_{20}$–$C_{24}$ fatty acid residues is bonded on a triglyceride molecule, wherein at least $L_1$ and/or $L_2$ is present.

DETAILED DESCRIPTION OF THE INVENTION

Preferred fats are triglyceride compositions wherein the amount of $L_1$ is more than 30 wt %, while the weight ratio $L_1:L_2$ is at least 3, while triglyceride compositions wherein the amount of $L_1$ is at least 40 wt % and the weight ratio of $L_1:L_2$ is at least 3.5 are even more preferred.

The most preferred $C_2$–$C_{12}$ saturated fatty acids are acetic acid, butyric acid, octanoic acid, and lauric acid. It was found, that fats with relatively low levels of $C_{16}$–$C_{18}$ saturated fatty acids could be obtained. Advantageously the level of $C_{16}$–$C_{18}$ saturated fatty acids is less than 8 wt %, in particular less than 5 wt %.

The most abundant polyunsaturated fatty acid L, is preferably DHA ($=C_{22:6}$). The second most abundant polyunsaturated fatty acid advantageously is EPA ($C_{20:5}$). Very useful triglycerides are obtained, when $L_1$=EPA and $L_2$=DHA.

We found that the best oxidative stability was obtained, if at least 5 wt %, preferably at least 10 wt %, most preferably at least 20 wt % of the saturated $C_2$–$C_{12}$ or $C_{20}$–$C_{24}$ fatty acid residues is bonded on a triglyceride molecule, wherein at least $L_1$ and/or $L_2$ is present.

Our triglycerides can be applied as such in foodproducts, however it can also be very suitable to blend our novel fats first, before applying them. Therefore part of our invention is also a blend of triglycerides, comprising 0.3–95 wt % of the triglyceride according to the invention, and 99.7–5 wt % of a complementary fat, having a solid fat index at 10° C. ($N_{10}$) that is either, at least 5% more, or at least 5% less than the $N_{10}$ of the triglycerides according to the invention.

Above blends suitably can be composed of 5–80 wt %, in particular 20–70 wt % of the triglycerides according to the invention, and 95–20 wt %, in particular 80–30 wt % of the complementary fat.

Many types of complementary fat could be applied. However we prefer to use complementary fats having a solid fat content (NMR-pulse; not stabilized) of more than 15 at 20° C., preferably more than 20. The N-values were measured on fats subjected to the following T-regime: 5 minutes at 60° C., 60 minutes at 0° C. and 30 minutes at the measuring temperature.

Very useful complementary fats for our blends can be selected from cocoa butter equivalents, cocoa butter, palm oil or fractions thereof, palmkernel oil or fractions thereof, interesterified mixtures of above fats or fractions or hardened components thereof, or from liquid oil, such as sunflower oil, high oleic sunflower oil, soyabean oil, rapeseed oil, cottonseed oil, safflower oil, high oleic safflower oil, maize oil, MCT oils or fish oils.

The blends so obtained display a solid fat content (NMR-pulse; not stabilized) of 0–85, preferably 10–70, most preferably 20–60 at 5° C. and less than 30, preferably<20, most preferably<5 at 35° C.

Although our fats already have an improved oxidative stability, we found that this stability can be further improved when our blends contain an effective amount of an oxidation stabilizer, selected from the group consisting of: natural or synthetic tocopherols, other natural anti-oxidants, BHT, BHA, free radical scavengers, enzymes with anti-oxidant properties.

Effective amounts can range from 100 ppm to 5 wt % (on fat).

Part of our invention are also the foodproducts, comprising a fat phase, such as spreads, margarine, cream alternative, infant food, chocolate, confectionery, bakery products, sauces, ice-creams, ice-cream coatings, cheese, soups, mayonnaise, dressings, enteral or parental products, wherein the fat phase contains a fat as described above.

Our fats can be obtained by preparing the pure triglycerides and blending these in the required ratios. However a very useful method for the preparation of our blends is an interesterification of a (non-hardened) fish oil with a saturated fatty acid. This interesterification can be performed by using an enzyme. In that case enzymes can be applied, that display a specificity for e.g. long chain polyunsaturated fatty acids over saturated fatty acids, or that display a preference for one long chain polyunsaturated fatty acid over another long chain polyunsaturated fatty acid.

In our example I we have set out another possible interesterification method for the preparation of our novel fats. According to this method a fish oil is first subjected to a glycerolysis in the presence of a lipase. The crude reaction product obtained is enriched in long chain polyunsaturated fatty acids. This crude product is reconverted to triglycerides by performing an interesterification, using a fat high in saturated fatty acids.

Other methods to prepare our novel fats are illustrated by our other examples.

LIST OF USED CODES AND THEIR EXPLANATION wf(TUNA)f=TUNAf=The olein fraction of semi refined tuna oil obtained by low temperature solvent fractionation, having at least 35% of DHA.
(BOO)s=The stearin fraction of an enzymic interesterified blend of high oleic sunflower oil and behenic acid.
fhPO=Fully hardened palm oil.
CCB=Cocoa butter.
POf37=Partially hardened palm oil olein fraction melting point of 37° C.
CN=Coconut oil.
CNs=Coconut oil stearin fraction.
nPOm=Wet fractionated palm oil mid fraction.
df(PO)f=Dry fractionated palm oil olein fraction.
HS1=Hardstock=The stearin fraction of a chemical interesterified blend of fully hardened palm oil and a fully hardened palm kernel olein fraction.
SF=Sunflower oil.
PO=Palm oil.
in=Interesterified.

EXAMPLE I

A fish oil enriched in 20:5 and 22:6 is prepared by reacting menhaden oil (composition given in table 1.) with glycerol in the presence of *Pseudomonas cepacia* lipase at a temperature of 37° C. The ratio of oil to glycerol is 3 (wt/wt) and the quantity of lipase is 1% by weight on oil. 5% water by weight is present in the glycerol. After 48 hours the reaction is terminated by heating to 100° C. and the glycerol is separated from the reaction mixture. The triglycerides are separated from the glyceride fraction by adsorption of the partial glycerides and the free fatty acids (FFA) onto silica, to give the enriched oil of composition shown in table 1. This oil is interesterified with hardened high erucic acid rapeseed oil (composition in table 1.) using a lipase catalyst (*Rhizomucor miehei*), to give the final product oil with a composition given in table 1. All the above processes are carried out under nitrogen to prevent deterioration of the oil.

TABLE 1

Fatty acid composition (wt %).

| | C14:0 | C16:0 | C16:1 | C16:u | C18:0 | C18:1 | C18:2 | C18:3 | C18:4 | C20:0 |
|---|---|---|---|---|---|---|---|---|---|---|
| Original oil | 8.3 | 19.6 | 11.9 | 6.5 | 3.4 | 12.4 | 1.3 | 1.5 | 2.5 | 0.8 |
| Enriched oil | 0.3 | 4.3 | 6.7 | 3.8 | 1.5 | 16.9 | 1.8 | 1.7 | 3.5 | 1.0 |
| Hardened high erucic acid rapeseed oil (HEAR oil) | 0.0 | 3.3 | 0.0 | 0.0 | 36.0 | 0.0 | 0.0 | 0.0 | 0.0 | 8.9 |
| 88% enriched fish oil + 12% hardened HEAR oil | 0.3 | 4.2 | 5.9 | 3.3 | 5.6 | 14.9 | 1.6 | 1.5 | 3.1 | 1.9 |

| | C20:1 | C20:5 | C20:u | C22:0 | C22:1 | C22:5 | C22:6 | C22:u | C24:0 |
|---|---|---|---|---|---|---|---|---|---|
| Original oil | 0.3 | 14.5 | 3.6 | 0.0 | 0.3 | 2.5 | 6.5 | 1.3 | 0.0 |
| Enriched oil | 2.8 | 28.1 | 6.8 | 0.0 | 0.0 | 5.6 | 13.6 | 1.9 | 0.0 |
| Hardened high erucic acid rapeseed oil (HEAR oil) | 0.0 | 0.0 | 0.0 | 49.2 | 0.0 | 0.0 | 0.0 | 0.0 | 2.6 |
| 88% enriched fish oil + 12% hardened HEAR oil | 2.5 | 24.7 | 6.0 | 5.9 | 0.0 | 4.9 | 12.0 | 1.7 | 0.3 |

EXAMPLE II

A low temperature solvent fractionation at −70° C. was done on semi refined tuna oil with the composition f mentioned in table II, under the conditions as mentioned in "Progress in the chemistry of fats and other lipids" vol. 3 Holman R. T et al 1995, using 4 L of acetone per Kg tuna oil to enrich the oil in DHA and EPA. After removal of the acetone the olein fraction of the tuna oil (=wf(tuna)f) with the composition, mentioned in table 2, was obtained. This fraction was stored in the freezer under nitrogen.

All the ingredients for the enzymic interesterification were stored at ambient for at least one hour. All oils were used as liquid oils. To the tuna oil olein fraction 400 ppm of anti-oxidant (BHT) was added.

The tuna oil olein fraction was divided in different portions. Then the liquid complementary fat was added to each of the tuna oil olein fractions and mixed in. A sample was taken for carbon number and FAME analyses. For the enzymic interesterification a 1,3 specific lipase (*Rhizomucor Miehei*) was used. The lipase was added to the mixed oils in a weight ratio of 40:1 oil:lipase. A nitrogen blanket was put over the mixture to prevent deterioration of the oil. The reaction mixture was put in a magnetic stirred heatblock and the temperature was adjusted to 60° C. After 96 hours the reaction was stopped.

The samples were cleaned through an alumina column to remove FFA, mono- and diglycerides. Carbon number and FAME analyses were done via GC on the samples before and after lipase treatment.

Two methods were used to prove that at least 5% of the total amount of C2–C12 and/or C20–C24 was bonded on a triglyceride molecule with L1 and/or L2. The first method involves a calculation and gives the maximum amount which is bonded on a triglyceride molecule with L1 and/or L2. The second method which involves an analytical method gives some information about the minimum amount which is bonded on the same triglyceride molecule with L1 and/or L2.

A statistical program was used to calculate a carbon number based on the randomized distribution of the fatty acids in a triglyceride molecule. This programm was checked by using the FAME results of a (random) chemical interesterification for a standard interesterified fat mix from palm oil stearin/palm kernel stearin and comparing the calculated carbon number profile with the measured carbon number profile (see table 3). The differences were very small so that it was concluded that the programm gives the correct results. Then the enzymic interesterification according to the invention was tested. The FAME and carbon number of the enzymic interesterified product was measured. The measured carbon number was equated to the calculated carbon number and the differences were very small. Because of this we concluded that the enzymic interesterification resulted in a random distribution of the fatty acids in the triglyceride molecule. In a randomized interesterified product it is possible to calculate the amount of C2–C12 and/or C20–C24 bonded on a triglyceride molecule with L1 and/or L2.

The second method is an analytical method. Two parts of the sample (Band a and band b) with a certain amount of unsaturation were collected by using Silver-ion HPLC. Band A had about 6 till 9 unsaturations and Band B had 9 till 18 unsaturations. On the triglycerides of the two bands FAME and carbon number analyses were done. From these FAME analyses a carbon number was calculated by using the statistical programm. This carbon number was equated to the measured carbon number. From these analyses and calculations it was possible to calculate the minimum amount of C2–C12 and/or C20–C24 which was bonded on a triglyceride molecule with L1 and/or L2. The actual amount will be even higher because there was more sample than just the two analyzed bands.

Interesterification experiments were done on the following blends:
  75/25 wf(tuna)f/tributyrin
  75/25 wf(tuna)f/tricaprin
  75/25 wf(tuna)f/(BOO)s
  75/25 wf(tuna)f/fhPO (=comparative example)

The composition of tributyrin; tricaprin; (BOO)s and fhPO are given in table 2.

The experiments were done according to the method described above. The experiments were stopped after 96 hours. The carbon number and FAME of the blends and the interesterified blends were determined. The results of the FAME analyses are listed in table 4 and the results of the carbon number analyses are listed in table 5.

The results of the calculated amount of C2–C12 and/or C20–C24 which is bonded on a triglyceride molecule with L1 and/or L2 are listed in table 6, 7 and 8. The results of the analyzed amount of C2–C12 and/or C20–C24 which is bonded on a triglyceride molecule with L1 and/or L2 are listed in table 9.

EXAMPLE III

Interesterification experiments were done on the following blends:
A: 75/25 wf(tuna)f/tributyrin
B: 75/25 wf(tuna)f/tricaprin
C: 75/25 wf(tuna)f/(BOO)s
D: 75/25 wf(tuna)f/fhPo (comparative example) The tributyrin, tricaprin, (BOO)s and fhPO are the same as in example II (see table 2).

The experiments were done according to the method described in example II. This tuna olein fraction was alumina treated to remove FFA, mono- and diglycerides, before lipase treatment. After 96 hours the experiments were stopped. The analyses of the reaction mixtures of tributyrin, tricaprin and (BOO)s were done. The results of all these analyses are listed in tables 10 and 11. Part of the reaction mixture was cleaned again by using an alumina column to remove the FFA, mono- and diglycerides and oxidised materials. This cleaned material was mixed in a ratio of 1/99 with a palm oil olein fraction with a bland smell. This was stored at ambient for three days and evaluated by the panel. The results from the panel using the different products obtained were as follows:

The panel was asked to make a ranking of the samples on fish smell.

C B A D

C B A D

C A B D

B C A D

Least flavour ----> Strongest flavour

Everyone in the panel agreed that the product from D was the worst and the others were far better. So the samples according to the invention (A, B and C) were all better than the comparative example (D).

The results of the calculated amount of C2–C12 and/or C20–C24 which is bonded on a triglyceride molecule with L1 and/or L2 are listed in table 12, 13 and 14. The results of the analyzed amount of C2–C12 and/or C20–C24 which is bonded on a triglyceride molecule with L1 and/or L2 are listed in table 15.

EXAMPLE IV

A fish oil concentrate was made according to the following procedure.
1. Chemical Hydrolysis of Tuna oil
Method adapted from Ratnayake et al (Fat Sci. Tech. 90 10 1988 page 381)
Tuna oil (200 g) was refluxed for 1 hour in an atmosphere of nitrogen with a mixture of 47 g of potassium hydroxide pellets, 260 mls ethanol (96%), and 88 mls deionised water. The saponified mixture was diluted with 500 mls of water and the non-saponifiable matter was extracted with hexane (3×100 ml). The aqueous layer was neutralised with 500 mls of 1 M HCl. The free fatty acids were extracted into hexane (3×100 ml). The hexane was removed by evaporation.
2. Urea Fractionation of Tuna Acids
Method adapted from Robles Medina et al JAOCS vol 72 no 5 (1995)
The fatty acids (100 g) were added with stirring to a hot (60° C.) solution of 400 g of Urea and 800 mls of ethanol. The mixture was stirred for 1 hour before the temperature was reduced by 1° C./hour to 4° C. at which temperature the mixture was held for 16 hours. The mixture was fractionated to remove the stearin fraction. The ethanol was removed from the olein fraction by evaporation. The olein was mixed with 250 mls of hexane and 250 mls of 1 M HCl. The hexane layer was isolated and the aqueous layer washed with a further 100 ml hexane. The hexane was removed by evaporation.
3. Recombination to Triglyceride
batch 1
47 g of Tuna acids were mixed with approximately 4 g of glycerol and 4 g of *Rhizomucor miehei* in a jacketed vessel at 55° C. with a magnetic stirrer. Nitrogen was allowed to blow over the surface to remove any water produced during the reaction. The reaction was allowed to continue for 10 days until the FFA had been substantially reduced. The product after removal of the enzyme by filtration was stirred at 60° C. with 50 g of basic alumina in 100 mls of hexane. The alumina was removed by filtration.
batch 2
The free fatty acids were divided into 4 samples which were recombined to triglyceride on 12 to 15 g scale in glass vials at 55° C. in a magnetic hot block. Typically 14 g of free fatty acid were mixed with 1.3 g glycerol and 0.7 g *Rhizomucor miehei*. Nitrogen was allowed to flow over the surface to remove water. The reactions were allowed to continue for 1 week. 50 g of product, after removal of the enzyme by filtration, was stirred at 60° C. with 270 g of basic alumina in 100 mls of hexane. The alumina was removed by filtration.

The oil from "Recombination to triglycerides" batch 1 was called D58.

Interesterification experiments were done on the following blends:
75/25 fish oil concentrate (=D58)/tricaprin
75/25 fish oil concentrate (=D58)/(BOO)s
The interesterification experiments were done according to the method of example II.

The interesterification experiments of the fish oil concentrate and the tricaprin and (BOO)s were stopped after 115 hours. The FAME and carbon number analysis were done, the results are listed in table 16 and 17.

The results of the calculated amount C2–C12 and/or C20–C24 which is bonded on a triglyceride molecule with L1 and/or L2 of these samples are listed in table 18 and 19.

EXAMPLE V

The interesterification experiments were done according to the method of example II. This time the interesterification reactions were stopped after 46 hours.

The two following interesterified blends were used
70/30 wf(TUNA)f (=D40)/Tributyrin
70/30 wf(TUNA)f (=D40)/(BOO)s
The FAME and carbon numbers of these interesterified mixtures are listed in table 20 and 21.

D40 being a tuna oil olein fraction, obtained by low temperature solvent fractionation, having about 38 wt % of DHA.

EXAMPLE VI

Blends were made of the two interesterified mixtures (=in(FISH)) and a complementary fat/fat blend for the following applications:

| Application | Reference | Blends inside the patent |
|---|---|---|
| Chocolate | Cocoa butter | Cocoa butter/in(FISH) 99/1 |
| Bakery | POf37/df(PO)f 40/60 | POf37/df(PO)f/in(FISH) 40/50/10 |
| Ice cream coatings | Coconut oil | CN/CNs/in(FISH) 90/5/5 |
| Ice cream | PO | PO/in(FISH) 90/10 |
| Non dairy creams | nPOm/df(PO)f 40/60 | nPOm/df(PO)f/in(FISH) 40/40/20 |
| Health margarines/ Health spreads | HS1/SF 13/87 | HS1/SF/in(FISH) 13/77/10 |
| Confectionery fillings | nPOm/df(PO)f 60/40 | nPOm/df(PO)f/in(FISH) 60/20/20 |
| Mayonnaise/ Sauces | SF | SF/in(FISH) 90/10 |
| Dressings | SF | SF/in(FISH) 90/10 |

The range of N-values of the references and measured N-values for the blends are listed in table 22a and 22b.

EXAMPLE VII

Range style dressings were made according to the following recipe:

|  | wt % |
|---|---|
| Liquid oil | 25.0 |
| Maltodextrin | 20.0 |
| Dried egg yolk | 0.8 |
| Xanthum gum | 0.4 |
| Vinegar | 5.0 |
| Water | 44.8 |

In above recipe three different liquid oils were applied. The liquid oil for the reference was Sunflower oil and the liquid oils according to the invention were as follows:

Sunflower oil/in(D40/tributyrin) 90/10
Sunflower oil/in(D40/(BOO)s) 90/10

The FAME results of the in(D40/tributyrin) and the in(D40/(BOO)s) are listed in table 20. Results of the NMR measurements of the two blends according to the invention are listed in table 22b.

A large batch of aqueous phase was manufactured and used for all the dressings. The water and maltodextrin were first blended using a Silverson mixer. The egg yolk, xanthum gum and vinegar were sequentially added whilst continuing to stir with the Silverson until complete mixing had occurred. At this stage the pH=3.25, therefore no further adjustment to the pH was made.

The oils were slowly added to the aqueous phase whilst mixing using the Silverson. Mixing was continued until all the oil had been dispersed. The dressings were transferred to 200 ml plastic sterile bottles.

The viscosities of the samples were determined using a Brookfield Viscometer fitted with a number 4 spindle rotating at 10 rpm. The samples were contained in identical 200 ml plastic bottles hence the viscosities are directly comparable with each other. For each sample the avarage of three measurements was taken with the sample being allowed to relax for 1 minute between each 1 minute of shear. The viscosity results of the dressings are listed in table 23.

The oil droplet size distribution was determined using a Malvern Mastersizer using a 45 mm filter. The results of these measurements, as Sauter-mean particle diameter are listed in table 23.

EXAMPLE VIII

Spreads were made according to the following recipe:

| Fat Phase | |
|---|---|
| Fat Blend | 40% |
| Hymono 7804 | 0.3% |
| Colour (2% β-carotene) | 0.02% |
| Total | 40.32% |
| Aqueous Phase (to pH 5.1) | |
| Water | 56.44% |
| Skimmed Milk Powder | 1.5% |
| Gelatin (270 bloom) | 1.5% |
| Potassium Sorbate | 0.15% |
| Citric Acid Powder | 0.07% |
| Total | 59.66% |

In above recipe three different fat blends were applied.

The fat blend for the reference was HS1/Sunflower oil 13/87 and the fat blends according to the invention were as follows:

HS1/Sunflower oil/in(D40/tributyrin) 13/77/10
HS1/Sunflower oil/in(D40/(BOO)s) 13/77/10

The FAME results of the in(D40/tributyrin) and the in(D40/(BOO)s) are listed in table 20. Results of the NMR measurements of the two blends according to the invention are listed in table 22a.

The spreads were processed according to the following procedure:

2 kg of material was prepared and processed.
A micro-votator processing line was set up as follows:

| Premix conditions | - | Stirrer Speed 60 rpm |
|---|---|---|
|  | - | Temperature 50° C. |
| pump | - | Proportioning pump set at 60% (30 g/min.). |
| A₁ conditions | - | Shaft speed 1000 rpm |
|  | - | Temperature set at 8° C. |
| C₁ conditions | - | Shaft speed 1000 rpm |
|  | - | Temperature set to 10° C. |
| A₂ conditions | - | Shaft Speed 1000 rpm |
|  | - | Temperature set to 10° C. |
| C₂ conditions | - | Shaft speed 1000 rpm |
|  | - | Temperature set to 13° C. |

The aqueous phase was prepared by heating the required amount of water to approximately 80° C. and then, using a silverson mixer, slowly mixing in the ingredients. The pH of the system was adjusted to 5.1 by adding 20% Lactic acid solution as required.

A premix was prepared by stirring the fat phase in the premix tank and then slowly adding in the aqueous phase. When addition was complete, the mix was stirred for a further 5 minutes before pumping through the line. When the process had stabilised (around 20 minutes), product was collected for storage and evaluation.

The typical process conditions were as follows:

| Sample | $A_{1\,Exit}$ (° C.) | $C_{1\,Exit}$ (° C.) | $A_{2\,Exit}$ (° C.) | $C_{2\,Exit}$ (° C.) | Line Pressure (bar) |
|---|---|---|---|---|---|
| Reference | 13.2 | 18.7 | 13.6 | 15.6 | 0.5 to 2 |
| HS1/SF/ in(D40/ tributyrin) 13/77/10 | 13.2 | 19.5 | 13.8 | 15.6 | 1 to 3.4 |
| HS1/SF/ in(D40/ (BOO)s) 13/77/10 | 12.3 | 19.1 | 13.8 | 15.5 | 1.2 to 3.5 |

For all three systems, very good oil continuous low fat spreads were produced using this system.

Evaluations were done on C-value and on conductivity. The C-value in g/cm² of the spreads was measured by using a cone penetrometer. The conductivity in $\mu$ siemens/cm was measured by using a Wayne Kerr.

| | 20° C. | |
|---|---|---|
| Sample | C-value | Conductivity |
| Reference | 190 | $10^{-5}$ |
| HS1/SF/ in (D40/tributyrin) | 180 | $10^{-5}$ |
| HS1/SF/ in (D40/(BOO)s) | 180 | $10^{-5}$ |

All samples spread very easily on grease-proof paper, with no obvious signs of water loss.

EXAMPLE IX

Ice cream was made according to the following recipe:

| | wt % |
|---|---|
| Fat blend | 10.0 |
| Skimmed milk powder | 10.0 |
| Icing sugar | 12.0 |
| Corn syrup solids | 4.0 |
| Dextrose monohydrate | 2.0 |
| Sherex IC 9330 ® | 0.6 |
| Water | 61.4 |
| Total | 100.0 |

Sherex IC 9330® is a product from Quest International and comprises mono- and diglycerides admixed with different stabilizers.

In above recipe three different fat blends were applied.

The fat blend for the reference was PO/Sunflower oil 90/10 and the fat blends according to the invention were as follows:

PO/in(D40/tributyrin) 90/10

PO/in(D40/(BOO)s) 90/10

The FAME results of the in(D40/tributyrin) and the in(D40/(BOO)s) are listed in table 20. Results of the NMR measurements of the two blends according to the invention are listed in table 22a.

All ingredients except the water and the fat were mixed. Then the cold water was added to this mixture. This mixture was heated in a water bath till a temperature of 70° C. Then the fully liquid palm oil was added to the mixture while "stirred" in the ultra-turrax. This emulsion was cooled in a water bath at 20° C. untill a temperature of 30° C. was reached. The emulsion was stirred in the ultra-turrax again. The batch ice cream machine was held for 24 hours at −28° C. prior to use. The emulsion was placed in the batch ice cream machine and stirred for 15 minutes. The resulting ice cream was stored at −20° C. for 24 hours and then evaluated.

The viscosity of the ice cream emulsion, prior to freezing was measured. The overrun and hardness were determined. The viscosity was measured by using the Haake viscometer.

Hardness was measured by using a Stevens texture analyser with a 45° cone at a speed of 0.5 mm/second till a deepness of 2 mm.

| Sample | Overrun (%) | Hardness (gram) |
|---|---|---|
| Reference | 31.5 | 142 |
| PO/in(D40/ tributyrin) | 31.5 | 148 |
| PO/in(D40/ (BOO)s) | 36.7 | 185 |

The viscosities of the emulsions were similar.

TABLE 2

FAME data for the components used

| FAME | Semi refined tuna oil | wf(TUNA)f | Tri-butyrin | Tricaprin | (BOO)s | fhPO |
|---|---|---|---|---|---|---|
| C4:0 | 0.0 | 0.0 | 99.0 | 0.0 | 0.0 | 0.0 |
| C10:0 | 0.0 | 0.0 | 0.0 | 99.7 | 0.0 | 0.0 |
| C12:0 | 0.1 | 0.0 | 0.0 | 0.3 | 0.0 | 0.3 |
| C12:othe | 0.0 | 0.0 | 0.0 | 0.0 | 0.0 | 0.0 |
| C14:0 | 3.5 | 1.7 | 0.0 | 0.0 | 0.1 | 1.0 |
| C14:othe | 1.6 | 0.3 | 0.0 | 0.0 | 0.0 | 0.0 |
| C16:0 | 20.8 | 3.1 | 0.0 | 0.0 | 1.9 | 41.7 |
| C16:1 | 5.4 | 7.6 | 0.0 | 0.0 | 0.0 | 0.0 |
| C16:othe | 4.7 | 3.2 | 0.0 | 0.0 | 0.0 | 0.0 |
| C18:0 | 6.1 | 0.6 | 0.0 | 0.0 | 3.1 | 54.6 |
| C18:1 | 14.8 | 16.1 | 0.0 | 0.0 | 29.0 | 1.5 |
| C18:2 | 1.2 | 3.1 | 0.0 | 0.0 | 2.3 | 0.2 |
| C18:3 | 0.7 | 0.9 | 0.0 | 0.0 | 0.0 | 0.0 |
| C18:othe | 1.9 | 1.7 | 0.0 | 0.0 | 0.0 | 0.0 |
| C20:0 | 0.4 | 0.0 | 0.0 | 0.0 | 3.4 | 0.5 |
| C20:1 | 1.1 | 1.1 | 0.0 | 0.0 | 0.1 | 0.0 |
| C20:2 | 0.0 | 0.2 | 0.0 | 0.0 | 0.0 | 0.0 |
| C20:3 | 0.0 | 0.0 | 0.0 | 0.0 | 0.0 | 0.0 |
| C20:4 | 0.0 | 0.0 | 0.0 | 0.0 | 0.0 | 0.0 |
| C20:5 | 5.1 | 12.0 | 0.0 | 0.0 | 0.0 | 0.0 |
| C20:othe | 3.1 | 4.0 | 0.0 | 0.0 | 0.0 | 0.0 |
| C22:0 | 0.0 | 0.0 | 0.0 | 0.0 | 58.5 | 0.1 |
| C22:1 | 0.3 | 0.0 | 0.0 | 0.0 | 0.1 | 0.0 |
| C22:5 | 1.5 | 2.1 | 0.0 | 0.0 | 0.0 | 0.0 |
| C22:6 | 24.8 | 39.6 | 0.0 | 0.0 | 0.0 | 0.0 |
| C22:othe | 2.9 | 2.8 | 0.0 | 0.0 | 0.0 | 0.0 |

TABLE 2-continued

FAME data for the components used

| FAME | Semi refined tuna oil | wf(TUNA)f | Tri-butyrin | Tricaprin | (BOO)s | fhPO |
|---|---|---|---|---|---|---|
| C24:0 | 0.0 | 0.0 | 0.0 | 0.0 | 1.5 | 0.1 |
| Others | 0.0 | 0.0 | 1.0 | 0.0 | 0.0 | 0.0 |
| Total | 100.0 | 100.0 | 100.0 | 100.0 | 100.0 | 100.0 |

TABLE 3

Programm check on chemical interesterification.

| FAME | wfPOs/PKs (blend) | in(wfPOs/PKs) | Calculated by statistical programm |
|---|---|---|---|
| C8:0 (%) | 0.6 | 0.6 | |
| C10:0 (%) | 1.1 | 1.1 | |
| C12:0 (%) | 22.5 | 22.5 | |
| C14:0 (%) | 10.0 | 9.9 | |
| C16:0 (%) | 50.2 | 50.5 | |
| C17:0 (%) | 0.1 | 0.1 | |
| C18:0 (%) | 40.3 | 4.3 | |
| C18:1 (%) | 9.9 | 10.0 | |
| C18:2 (%) | 0.6 | 0.7 | |
| C20:0 (%) | 0.3 | 0.3 | |
| C22:0 (%) | 0.1 | 0.0 | |

TABLE 3-continued

Programm check on chemical interesterification.

| | wfPOs/PKs (blend) | in(wfPOs/PKs) | Calculated by statistical programm |
|---|---|---|---|
| Carbon number | | | |
| C28 | 0.1 | 0.0 | 0.0 |
| C30 | 0.2 | 0.0 | 0.0 |
| C32 | 1.4 | 0.4 | 0.2 |
| C34 | 2.7 | 0.7 | 0.4 |
| C36 | 11.5 | 3.3 | 2.5 |
| C38 | 10.4 | 4.2 | 3.4 |
| C40 | 6.4 | 12.7 | 11.4 |
| C42 | 4.1 | 12.3 | 11.7 |
| C44 | 2.4 | 21.9 | 22.1 |
| C46 | 3.7 | 17.0 | 17.8 |
| C48 | 30.5 | 15.5 | 17.0 |
| C50 | 21.7 | 9.0 | 10.2 |
| C52 | 3.8 | 2.5 | 2.9 |
| C54 | 1.1 | 0.4 | 0.3 |
| C56 | 0.1 | 0.1 | 0.0 |
| C58 | 0.1 | 0.0 | 0.0 |

TABLE 4

FAME results

| FAME | TUNAf/butyrin (blend) | in (TUNAf/butyrin) | TUNAf/caprin (blend) | in (TUNAf/caprin) | TUNAf/BOOs (blend) | in (TUNAf/BOOs) | TUNAf/fhPO (blend) | in (TUNAf/fhPO) |
|---|---|---|---|---|---|---|---|---|
| C4:0 | 30.3 | 36.7 | 0.0 | 0.0 | 0.0 | 0.0 | 0.0 | 0.0 |
| C10:0 | 0.0 | 0.0 | 37.0 | 34.5 | 0.0 | 0.0 | 0.0 | 0.0 |
| C12:0 | 0.1 | 0.0 | 0.1 | 0.1 | 0.1 | 0.1 | 0.0 | 0.0 |
| C12:othe | 0.1 | 0.0 | 0.1 | 0.1 | 0.1 | 0.1 | 0.0 | 0.0 |
| C14:0 | 1.6 | 1.6 | 1.3 | 1.4 | 1.4 | 1.4 | 1.8 | 1.8 |
| C14:othe | 0.6 | 0.6 | 0.4 | 0.6 | 0.6 | 0.5 | 0.5 | 0.5 |
| C16:0 | 4.8 | 4.9 | 4.1 | 4.4 | 5.0 | 5.0 | 19.5 | 18.6 |
| C16:1 | 5.1 | 5.2 | 4.5 | 4.6 | 4.4 | 4.5 | 4.5 | 4.7 |
| C16:othe | 2.7 | 2.8 | 2.4 | 2.6 | 2.4 | 2.5 | 2.4 | 2.5 |
| C18:0 | 0.7 | 0.8 | 0.6 | 0.7 | 1.8 | 1.8 | 20.6 | 19.9 |
| C18:1 | 11.4 | 11.7 | 10.1 | 10.5 | 21.2 | 21.0 | 10.5 | 10.9 |
| C18:2 | 1.2 | 1.2 | 1.1 | 1.1 | 2.0 | 2.0 | 2.0 | 1.8 |
| C18:3 | 0.7 | 0.6 | 0.6 | 0.7 | 0.6 | 0.6 | 0.5 | 0.6 |
| C18:othe | 1.8 | 1.5 | 1.6 | 2.0 | 1.6 | 1.6 | 0.9 | 0.9 |
| C20:0 | 0.0 | 0.0 | 0.0 | 0.0 | 1.2 | 1.2 | 0.2 | 0.2 |
| C20:1 | 0.8 | 0.8 | 0.7 | 0.8 | 0.7 | 0.8 | 0.8 | 1.0 |
| C20:2 | 0.3 | 0.2 | 0.2 | 0.3 | 0.2 | 0.2 | 0.3 | 0.2 |
| C20:3 | 0.2 | 0.2 | 0.2 | 0.3 | 0.3 | 0.2 | 0.2 | 0.1 |
| | 1.7 | 1.5 | 1.6 | 1.7 | 1.6 | 1.6 | 1.6 | 1.7 |
| C20:5 | 7.0 | 5.8 | 6.4 | 6.2 | 6.3 | 6.2 | 6.5 | 6.4 |
| C20:oth | 0.7 | 0.5 | 0.6 | 0.7 | 0.6 | 0.6 | 0.7 | 0.7 |
| C22:0 | 0.0 | 0.0 | 0.0 | 0.0 | 21.8 | 21.3 | 0.1 | 0.1 |
| C22:1 | 0.3 | 0.3 | 0.3 | 0.3 | 0.0 | 0.0 | 0.3 | 0.3 |
| C22:5 | 1.2 | 1.1 | 1.2 | 1.2 | 1.2 | 1.2 | 1.3 | 1.3 |

TABLE 4-continued

FAME results

| FAME | TUNAf/ butyrin (blend) | in (TUNAf/ butyrin) | TUNAf/ caprin (blend) | in (TUNAf/ caprin) | TUNAf/ BOOs (blend) | in (TUNAf/ BOOs) | TUNAf/ fhPO (blend) | in (TUNAf/ fhPO) |
|---|---|---|---|---|---|---|---|---|
| C22:6 | 25.1 | 20.3 | 23.2 | 23.2 | 23.0 | 23.6 | 23.1 | 23.7 |
| C22:othe | 1.9 | 1.8 | 1.5 | 2.2 | 1.8 | 1.9 | 1.9 | 2.1 |
| C24:0 | 0.0 | 0.0 | 0.0 | 0.0 | 0.4 | 0.4 | 0.0 | 0.0 |
| Total | 100.3 | 100.1 | 99.8 | 100.2 | 100.3 | 100.3 | 100.2 | 100.0 |

TABLE 5

Carbon number results

| Carbon number | TUNAf/ butyrin (blend) | in (TUNAf/ butyrin) | TUNAf/ caprin (blend) | in (TUNAf/ caprin) | TUNAf/ BOOs (blend) | in (TUNAf/ BOOs) | TUNAf/ fhPO (blend) | in (TUNAf/ fhPO) |
|---|---|---|---|---|---|---|---|---|
| C12 | 19.9 | 11.0 | 0.0 | 0.0 | 0.0 | 0.0 | 0.0 | 0.0 |
| C20 | 0.0 | 0.1 | 0.0 | 0.0 | 0.0 | 0.0 | 0.0 | 0.0 |
| C22 | 0.0 | 2.7 | 0.0 | 0.0 | 0.0 | 0.0 | 0.0 | 0.0 |
| C24 | 0.0 | 12.7 | 0.0 | 0.0 | 0.0 | 0.0 | 0.0 | 0.0 |
| C26 | 0.0 | 11.2 | 0.0 | 0.0 | 0.0 | 0.0 | 0.0 | 0.0 |
| C28 | 0.0 | 6.7 | 0.0 | 0.0 | 0.0 | 0.0 | 0.0 | 0.0 |
| C30 | 0.0 | 6.0 | 37.6 | 9.5 | 0.0 | 0.0 | 0.0 | 0.0 |
| C32 | 0.0 | 0.2 | 0.2 | 0.1 | 0.0 | 0.0 | 0.0 | 0.0 |
| C34 | 0.2 | 0.7 | 0.1 | 1.2 | 0.0 | 0.0 | 0.0 | 0.0 |
| C36 | 0.4 | 2.2 | 0.1 | 6.9 | 0.2 | 0.0 | 0.0 | 0.0 |
| C38 | 0.7 | 3.8 | 0.3 | 8.5 | 0.4 | 0.1 | 0.0 | 0.0 |
| C40 | 1.2 | 5.6 | 0.5 | 5.8 | 0.7 | 0.2 | 0.0 | 0.0 |
| C42 | 1.4 | 7.1 | 0.7 | 11.0 | 1.1 | 0.5 | 0.0 | 0.0 |
| C44 | 1.2 | 6.3 | 0.7 | 5.0 | 0.9 | 0.7 | 0.0 | 0.2 |
| C46 | 1.4 | 4.7 | 0.9 | 6.4 | 0.7 | 0.6 | 0.2 | 0.6 |
| C48 | 1.9 | 6.7 | 1.4 | 9.1 | 1.9 | 2.0 | 3.2 | 2.9 |
| C50 | 4.0 | 1.6 | 3.1 | 8.5 | 3.7 | 3.7 | 14.9 | 10.2 |
| C52 | 6.9 | 1.4 | 5.3 | 6.2 | 5.5 | 6.8 | 18.6 | 16.2 |
| C54 | 11.0 | 1.9 | 8.7 | 9.5 | 9.3 | 10.9 | 13.5 | 18.7 |
| C56 | 14.0 | 2.3 | 11.2 | 3.5 | 12.8 | 15.2 | 11.6 | 16.6 |
| C58 | 14.5 | 2.2 | 11.1 | 3.2 | 19.1 | 17.7 | 12.4 | 14.3 |
| C60 | 12.5 | 1.9 | 10.3 | 3.1 | 15.5 | 16.0 | 13.4 | 10.1 |
| C62 | 7.1 | 1.0 | 6.2 | 1.9 | 25.2 | 15.7 | 12.1 | 10.2 |
| C64 | 1.7 | 0.0 | 1.6 | 0.6 | 2.1 | 4.7 | 0.0 | 0.0 |
| C66 | 0.0 | 0.0 | 0.0 | 0.0 | 0.9 | 4.7 | 0.0 | 0.0 |
| C68 | 0.0 | 0.0 | 0.0 | 0.0 | 0.0 | 0.5 | 0.0 | 0.0 |
| Total | 100.0 | 100.0 | 100.0 | 100.0 | 100.0 | 100.0 | 99.9 | 100.0 |

TABLE 6

Calculated results of example II of the amount of
C4:0 which is bonded on a triglyceride molecule with L1 and/or L2.
75/25 wf(tuna)f/tributyrin

| Carbon number | Analyzed (wt %) | Calculated (wt %) | % Bu + x + L1/L2 (wt %) | % Bu + Bu + L1/L2 (wt %) | Bu wt % | wt % of the total added amount Bu bonded on a molecule with L1 and/or L2 |
|---|---|---|---|---|---|---|
| C12 | 11.0 | 14.7 | 0.0 | 0.0 | 0.0 | 0.0 |
| C20 | 0.1 | 0.0 | 0.0 | 0.0 | 0.0 | 0.0 |
| C22 | 2.7 | 1.6 | 0.0 | 0.0 | 0.0 | 0.0 |
| C24 | 12.7 | 9.1 | 0.0 | 0.0 | 0.0 | 0.0 |
| C26 | 11.2 | 10.7 | 0.0 | 0.0 | 0.0 | 0.0 |
| C28 | 6.7 | 5.9 | 0.0 | 3.9 | 1.1 | 3.0 |
| C30 | 6.0 | 15.1 | 0.0 | 13.0 | 3.5 | 9.4 |
| C32 | 0.2 | 0.1 | 0.0 | 0.0 | 0.0 | 0.0 |
| C34 | 0.7 | 0.6 | 0.0 | 0.0 | 0.0 | 0.0 |
| C36 | 2.2 | 2.3 | 0.0 | 0.0 | 0.0 | 0.0 |
| C38 | 3.8 | 4.2 | 0.0 | 0.0 | 0.0 | 0.0 |
| C40 | 5.6 | 5.3 | 2.4 | 0.0 | 0.2 | 0.7 |
| C42 | 7.1 | 7.7 | 5.7 | 0.0 | 0.5 | 1.5 |
| C44 | 6.3 | 6.7 | 5.4 | 0.0 | 0.5 | 1.3 |

TABLE 6-continued

Calculated results of example II of the amount of
C4:0 which is bonded on a triglyceride molecule with L1 and/or L2.
75/25 wf(tuna)f/tributyrin

| Carbon number | Analyzed (wt %) | Calculated (wt %) | % Bu + x + L1/L2 (wt %) | % Bu + Bu + L1/L2 (wt %) | Bu wt % | wt % of the total added amount Bu bonded on a molecule with L1 and/or L2 |
|---|---|---|---|---|---|---|
| C46 | 4.7 | 3.4 | 2.7 | 0.0 | 0.2 | 0.6 |
| C48 | 6.7 | 4.4 | 4.0 | 0.0 | 0.3 | 0.9 |
| C50 | 1.6 | 0.5 | 0.0 | 0.0 | 0.0 | 0.0 |
| C52 | 1.4 | 0.8 | 0.0 | 0.0 | 0.0 | 0.0 |
| C54 | 1.9 | 1.2 | 0.0 | 0.0 | 0.0 | 0.0 |
| C56 | 2.3 | 1.4 | 0.0 | 0.0 | 0.0 | 0.0 |
| C58 | 2.2 | 1.4 | 0.0 | 0.0 | 0.0 | 0.0 |
| C60 | 1.9 | 1.3 | 0.0 | 0.0 | 0.0 | 0.0 |
| C62 | 1.0 | 0.9 | 0.0 | 0.0 | 0.0 | 0.0 |
| C64 | 0.0 | 0.4 | 0.0 | 0.0 | 0.0 | 0.0 |
| C66 | 0.0 | 0.3 | 0.0 | 0.0 | 0.0 | 0.0 |
| Total | 100.0 | 100.0 | | | 6.4 | 17.5 | x = all fatty acids except Bu (C4:0)
/ = or

TABLE 7

Calculated results of example II of the amount of
C10:0 which is bonded on a triglyceride molecule with L1 and/or L2.
75/25 wf(tuna)f/tricaprin

| Carbon number | Analyzed (wt %) | Calculated (wt %) | Ca + x + L1/L2 (wt %) | Ca + Ca + L1/L2 (wt %) | Ca wt % | wt % of the total added amount Ca bonded on a molecule with L1 and/or L2 |
|---|---|---|---|---|---|---|
| C30 | 9.5 | 7.5 | 0.0 | 0.0 | 0.0 | 0.0 |
| C32 | 0.1 | 0.1 | 0.0 | 0.0 | 0.0 | 0.0 |
| C34 | 1.2 | 1.1 | 0.0 | 0.0 | 0.0 | 0.0 |
| C36 | 6.9 | 6.0 | 0.0 | 0.0 | 0.0 | 0.0 |
| C38 | 8.5 | 7.4 | 0.0 | 0.0 | 0.0 | 0.0 |
| C40 | 5.8 | 5.3 | 0.0 | 2.9 | 1.5 | 4.2 |
| C42 | 11.0 | 14.5 | 0.0 | 10.5 | 5.0 | 14.5 |
| C44 | 5.0 | 4.4 | 0.3 | 0.0 | 0.1 | 0.2 |
| C46 | 6.4 | 6.1 | 2.4 | 0.0 | 0.5 | 1.5 |
| C48 | 9.1 | 9.7 | 6.9 | 0.0 | 1.4 | 4.2 |
| C50 | 8.5 | 9.4 | 7.2 | 0.0 | 1.4 | 4.2 |
| C52 | 6.2 | 6.3 | 4.2 | 0.0 | 0.8 | 2.3 |
| C54 | 9.5 | 8.5 | 6.2 | 0.0 | 1.1 | 3.3 |
| C56 | 3.5 | 2.9 | 0.0 | 0.0 | 0.0 | 0.0 |
| C58 | 3.2 | 3.0 | 0.0 | 0.0 | 0.0 | 0.0 |
| C60 | 3.1 | 3.2 | 0.0 | 0.0 | 0.0 | 0.0 |
| C62 | 1.9 | 2.4 | 0.0 | 0.0 | 0.0 | 0.0 |
| C64 | 0.6 | 1.2 | 0.0 | 0.0 | 0.0 | 0.0 |
| C66 | 0.0 | 1.0 | 0.0 | 0.0 | 0.0 | 0.0 |
| Total | 100.0 | 100.0 | | | 11.9 | 34.4 | x = All fatty acids except Ca (C10:0)
/ = or

TABLE 8

Calculated results of example II of the amount of
C22:0 which is bonded on a triglyceride molecule with L1 and/or L2.
75/25 wf(tuna)f/(BOO)s

| Carbon number | Analyzed (wt %) | Calculated (wt %) | Be + x + L1/L2 (wt %) | Be + Be + L1/L2 (wt %) | Be wt % | wt % of the total added amount Be bonded on a molecule with L1 and/or L2 |
|---|---|---|---|---|---|---|
| C38 | 0.1 | 0.0 | 0.0 | 0.0 | 0.0 | 0.0 |
| C40 | 0.2 | 0.0 | 0.0 | 0.0 | 0.0 | 0.0 |
| C42 | 0.5 | 0.0 | 0.0 | 0.0 | 0.0 | 0.0 |

TABLE 8-continued

Calculated results of example II of the amount of
C22:0 which is bonded on a triglyceride molecule with L1 and/or L2.
75/25 wf(tuna)f/(BOO)s

| Carbon number | Analyzed (wt %) | Calculated (wt %) | Be + x + L1/L2 (wt %) | Be + Be + L1/L2 (wt %) | Be wt % | wt % of the total added amount Be bonded on a molecule with L1 and/or L2 |
|---|---|---|---|---|---|---|
| C44 | 0.7 | 0.0 | 0.0 | 0.0 | 0.0 | 0.0 |
| C46 | 0.6 | 0.2 | 0.0 | 0.0 | 0.0 | 0.0 |
| C48 | 2.0 | 0.8 | 0.0 | 0.0 | 0.0 | 0.0 |
| C50 | 3.7 | 2.4 | 0.0 | 0.0 | 0.0 | 0.0 |
| C52 | 6.8 | 5.1 | 0.0 | 0.0 | 0.0 | 0.0 |
| C54 | 10.9 | 8.9 | 0.0 | 0.0 | 0.0 | 0.0 |
| C56 | 15.2 | 14.0 | 0.0 | 0.0 | 0.0 | 0.0 |
| C58 | 17.7 | 17.0 | 1.5 | 0.0 | 0.6 | 2.7 |
| C60 | 16.0 | 16.5 | 5.1 | 0.0 | 1.9 | 8.8 |
| C62 | 15.7 | 18.8 | 7.8 | 0.0 | 2.8 | 13.0 |
| C64 | 4.7 | 6.8 | 2.4 | 0.7 | 1.3 | 6.1 |
| C66 | 4.7 | 9.2 | 3.9 | 2.6 | 3.0 | 14.2 |
| C68 | 0.5 | 0.0 | 0.0 | 0.0 | 0.0 | 0.0 |
| Total | 100.0 | 99.7 | 0.0 | 0.0 | 9.5 | 44.8 | x = All fatty acids except Be (C22:0)
/ = or

TABLE 9

Analyzed results of example II of the amount of C2–C12 and or C20–C24
which is bonded on a triglyceride molecule with L1 and/or L2.

| | HPLC band | Band as % TAGs (g/100 g) | Sum of Cno's containing target TAG in band (% wt) | Sum of target acids in band (% wt) | Target acids in target TAGs in band (g/100 g) | Target acids in total FAME on TG (% wt) | Therefore target acids in target TAGs (% wt on total FAME) |
|---|---|---|---|---|---|---|---|
| in(TUNAf/ Butyrin) | A | 21.9 | 79.8 | 20.2 | 3.5 | 36.7 | 9.6 |
| | B | 19.5 | 62.8 | 5.9 | 0.7 | 36.7 | 2.0 |
| Total: | | | | | | | 11.6 |
| in(TUNAf/ Caprin) | A | 28.3 | 92.0 | 28.9 | 7.5 | 34.5 | 21.8 |
| | B | 26.5 | 56.6 | 21.1 | 1.8 | 34.5 | 5.3 |
| Total: | | | | | | | 27.1 |
| in(TUNAf/ BOOs) | A | 34.2 | 15.3 | 21.5 | 1.1 | 21.3 | 4.9 |
| | B | 32.0 | 10.0 | 8.4 | 0.3 | 21.3 | 1.2 |
| Total: | | | | | | | 6.1 |

TABLE 10

FAME results example III

| FAME | TUNAf/ butyrin (blend) | in (TUNAf/ butyrin) | TUNAf/ caprin (blend) | in (TUNAf/ caprin) | TUNAf/ BOOs (blend) | in (TUNAf/ BOOs) | in (TUNAf/ fhPO) |
|---|---|---|---|---|---|---|---|
| C4:0 | 27.6 | 28.3 | 0.0 | 0.0 | 0.0 | 0.0 | 0.0 |
| C10:0 | 0.0 | 0.0 | 29.7 | 28.5 | 0.0 | 0.0 | 0.0 |
| C12:0 | 0.0 | 0.0 | 0.1 | 0.1 | 0.1 | 0.1 | 0.1 |
| C12:other | 0.4 | 0.3 | 0.1 | 0.1 | 0.1 | 0.1 | 0.1 |
| C14:0 | 1.5 | 1.5 | 1.4 | 1.4 | 1.4 | 1.5 | 1.8 |
| C14:other | 0.5 | 0.4 | 0.5 | 0.5 | 0.5 | 0.5 | 0.6 |
| C16:0 | 2.7 | 2.7 | 2.5 | 2.5 | 3.1 | 3.2 | 14.8 |
| C16:1 | 5.2 | 5.2 | 5.1 | 5.0 | 5.0 | 5.1 | 5.2 |
| C16:other | 2.5 | 2.7 | 2.3 | 2.5 | 2.5 | 2.5 | 2.6 |
| C18:0 | 0.3 | 0.4 | 0.3 | 0.3 | 1.2 | 1.2 | 17.3 |
| C18:1 | 11.4 | 11.4 | 11.1 | 11.0 | 19.9 | 20.5 | 12.1 |
| C18:2 | 1.3 | 1.3 | 1.3 | 1.3 | 2.0 | 2.0 | 1.4 |
| C18:3 | 0.7 | 0.7 | 0.7 | 0.7 | 0.7 | 0.7 | 0.7 |
| C18:other | 2.1 | 2.0 | 1.9 | 2.0 | 1.9 | 1.9 | 1.8 |
| C20:0 | 0.0 | 0.0 | 0.0 | 0.0 | 0.9 | 0.9 | 0.2 |
| C20:1 | 0.7 | 0.7 | 0.7 | 0.7 | 0.8 | 0.8 | 0.8 |

TABLE 10-continued

FAME results example III

| FAME | TUNAf/ butyrin (blend) | in (TUNAf/ butyrin) | TUNAf/ caprin (blend) | in (TUNAf/ caprin) | TUNAf/ BOOs (blend) | in (TUNAf/ BOOs) | in (TUNAf/ fhPO) |
|---|---|---|---|---|---|---|---|
| C20:2 | 0.2 | 0.2 | 0.2 | 0.2 | 0.2 | 0.2 | 0.2 |
| C20:3 | 0.2 | 0.2 | 0.2 | 0.2 | 0.3 | 0.3 | 0.2 |
| C20:4 | 1.8 | 1.8 | 1.8 | 1.8 | 1.8 | 1.7 | 1.7 |
| C20:5 | 8.2 | 7.9 | 8.0 | 8.0 | 8.1 | 7.6 | 7.5 |
| C20:other | 0.9 | 0.9 | 0.9 | 0.9 | 0.9 | 0.9 | 0.7 |
| C22:0 | 0.0 | 0.0 | 0.0 | 0.0 | 16.4 | 17.5 | 0.0 |
| C22:1 | 0.2 | 0.2 | 0.2 | 0.3 | 0.0 | 0.0 | 0.3 |
| C22:5 | 1.4 | 1.3 | 1.3 | 1.3 | 1.5 | 1.4 | 1.3 |
| C22:6 | 28.1 | 28.3 | 27.6 | 28.9 | 28.5 | 27.4 | 26.6 |
| C22:other | 1.9 | 1.9 | 1.9 | 1.9 | 1.9 | 1.9 | 1.8 |
| C24:0 | 0.0 | 0.0 | 0.0 | 0.0 | 0.3 | 0.3 | 0.0 |
| Total | 99.8 | 100.3 | 99.8 | 100.1 | 100.0 | 100.2 | 99.8 |

TABLE 11

Carbon number results example III

| Carbon number | TUNAf/ butyrin (blend) | in (TUNAf/ butyrin) | TUNAf/ caprin (blend) | in (TUNAf/ caprin) | TUNAf/ BOOs (blend) | in (TUNAf/ BOOs) | in (TUNAf/ fhPO) |
|---|---|---|---|---|---|---|---|
| C12 | 16.6 | 6.7 | 0.0 | 0.0 | 0.0 | 0.0 | 0.0 |
| C20 | 0.0 | 0.1 | 0.0 | 0.0 | 0.0 | 0.0 | 0.0 |
| C22 | 0.0 | 1.4 | 0.0 | 0.0 | 0.0 | 0.0 | 0.0 |
| C24 | 0.0 | 6.3 | 0.0 | 0.0 | 0.0 | 0.0 | 0.0 |
| C26 | 0.0 | 9.4 | 0.0 | 0.0 | 0.0 | 0.0 | 0.0 |
| C28 | 0.0 | 6.1 | 0.0 | 0.0 | 0.0 | 0.0 | 0.0 |
| C30 | 0.0 | 7.3 | 30.0 | 4.7 | 0.0 | 0.0 | 0.0 |
| C32 | 0.0 | 0.2 | 0.2 | 0.1 | 0.0 | 0.0 | 0.0 |
| C34 | 0.0 | 0.4 | 0.1 | 0.9 | 0.0 | 0.0 | 0.0 |
| C36 | 0.0 | 1.7 | 0.2 | 4.2 | 0.0 | 0.0 | 0.1 |
| C38 | 0.1 | 3.5 | 0.0 | 6.1 | 0.0 | 0.0 | 0.1 |
| C40 | 0.2 | 5.9 | 0.0 | 5.0 | 0.2 | 0.1 | 0.2 |
| C42 | 0.3 | 8.0 | 0.0 | 9.3 | 0.4 | 0.4 | 0.4 |
| C44 | 0.4 | 8.1 | 0.1 | 4.3 | 0.4 | 0.5 | 0.6 |
| C46 | 0.9 | 6.2 | 0.3 | 6.2 | 0.7 | 0.8 | 1.3 |
| C48 | 1.1 | 11.0 | 0.6 | 9.3 | 1.0 | 1.6 | 3.9 |
| C50 | 3.1 | 0.9 | 2.3 | 9.7 | 2.9 | 3.6 | 9.7 |
| C52 | 5.8 | 1.2 | 4.7 | 7.6 | 5.3 | 7.2 | 14.9 |
| C54 | 10.1 | 2.1 | 8.3 | 11.5 | 9.0 | 11.5 | 17.7 |
| C56 | 24.3 | 3.0 | 12.4 | 4.9 | 13.6 | 16.4 | 17.5 |
| C58 | 16.5 | 3.6 | 14.4 | 4.9 | 20.5 | 19.4 | 13.1 |
| C60 | 14.9 | 3.6 | 13.8 | 5.2 | 16.1 | 17.3 | 10.7 |
| C62 | 11.0 | 2.9 | 8.6 | 4.4 | 25.5 | 15.6 | 7.0 |
| C64 | 3.4 | 0.4 | 3.5 | 1.7 | 3.5 | 3.9 | 2.3 |
| C66 | 1.3 | 0.0 | 0.5 | 0.0 | 0.9 | 1.7 | 0.5 |
| C68 | 0.0 | 0.0 | 0.0 | 0.0 | 0.0 | 0.0 | 0.0 |
| Total | 100.0 | 100.0 | 100.0 | 100.0 | 100.0 | 100.0 | 100.0 |

TABLE 12

Calculated results of example III of the amount of
C4 which is bonded on a triglyceride molecule with L1 and/or L2.
75/25 wf(tuna)f/tributyrin

| Carbon number | Analyzed (wt %) | Calculated (wt %) | % Bu + x + L1/L2 (wt %) | % Bu + Bu + L1/L2 (wt %) | Bu wt % | wt % of the total added amount Bu bonded on a molecule with L1 and/or L2 |
|---|---|---|---|---|---|---|
| C12 | 6.7 | 8.4 | 0.0 | 0.0 | 0.0 | 0.0 |
| C20 | 0.1 | 0.0 | 0.0 | 0.0 | 0.0 | 0.0 |
| C22 | 1.4 | 1.0 | 0.0 | 0.0 | 0.0 | 0.0 |
| C24 | 6.3 | 5.6 | 0.0 | 0.0 | 0.0 | 0.0 |
| C26 | 9.4 | 8.0 | 0.0 | 0.0 | 0.0 | 0.0 |
| C28 | 6.1 | 5.7 | 0.0 | 3.9 | 1.1 | 3.9 |

TABLE 12-continued

Calculated results of example III of the amount of
C4 which is bonded on a triglyceride molecule with L1 and/or L2.
75/25 wf(tuna)f/tributyrin

| Carbon number | Analyzed (wt %) | Calculated (wt %) | % Bu + x + L1/L2 (wt %) | % Bu + Bu + L1/L2 (wt %) | Bu wt % | wt % of the total added amount Bu bonded on a molecule with L1 and/or L2 |
|---|---|---|---|---|---|---|
| C30 | 7.3 | 15.1 | 0.0 | 13.5 | 3.6 | 12.7 |
| C32 | 0.2 | 0.0 | 0.0 | 0.0 | 0.0 | 0.0 |
| C34 | 0.4 | 0.4 | 0.0 | 0.0 | 0.0 | 0.0 |
| C36 | 1.7 | 1.7 | 0.0 | 0.0 | 0.0 | 0.0 |
| C38 | 3.5 | 3.4 | 0.3 | 0.0 | 0.1 | 0.4 |
| C40 | 5.9 | 5.4 | 2.4 | 0.0 | 0.2 | 0.8 |
| C42 | 8.0 | 8.7 | 6.6 | 0.0 | 0.6 | 2.2 |
| C44 | 8.1 | 9.0 | 7.7 | 0.0 | 0.7 | 2.5 |
| C46 | 6.2 | 5.7 | 5.1 | 0.0 | 0.4 | 1.6 |
| C48 | 11.0 | 7.4 | 7.3 | 0.0 | 0.6 | 2.1 |
| C50 | 0.9 | 0.4 | 0.0 | 0.0 | 0.0 | 0.0 |
| C52 | 1.2 | 0.9 | 0.0 | 0.0 | 0.0 | 0.0 |
| C54 | 2.1 | 1.5 | 0.0 | 0.0 | 0.0 | 0.0 |
| C56 | 3.0 | 2.1 | 0.0 | 0.0 | 0.0 | 0.0 |
| C58 | 3.6 | 2.4 | 0.0 | 0.0 | 0.0 | 0.0 |
| C60 | 3.6 | 2.7 | 0.0 | 0.0 | 0.0 | 0.0 |
| C62 | 2.9 | 2.2 | 0.0 | 0.0 | 0.0 | 0.0 |
| C64 | 0.4 | 1.2 | 0.0 | 0.0 | 0.0 | 0.0 |
| C66 | 0.0 | 1.1 | 0.0 | 0.0 | 0.0 | 0.0 |
| Total | 100.0 | 100.0 | | | 7.4 | 26.3 | x = All fatty acids except Bu (C4:0)
/ = or

TABLE 13

Calculated results of example III of the amount of
C10:0 which is bonded on a triglyceride molecule with L1 and/or L2.
75/25 wf(tuna)f/tricaprin

| Carbon number | Analyzed (wt %) | Calculated (wt %) | Ca + x + L1/L2 (wt %) | Ca + Ca + L1/L2 (wt %) | Ca wt % | wt % of the total added amount Ca bonded on a molecule with L1 and/or L2 |
|---|---|---|---|---|---|---|
| C30 | 4.7 | 4.6 | 0.0 | 0.0 | 0.0 | 0.0 |
| C32 | 0.1 | 0.0 | 0.0 | 0.0 | 0.0 | 0.0 |
| C34 | 0.9 | 0.8 | 0.0 | 0.0 | 0.0 | 0.0 |
| C36 | 4.2 | 3.8 | 0.0 | 0.0 | 0.0 | 0.0 |
| C38 | 6.1 | 5.6 | 0.0 | 0.0 | 0.0 | 0.0 |
| C40 | 5.0 | 4.6 | 0.0 | 2.8 | 1.4 | 4.9 |
| C42 | 9.3 | 12.5 | 0.0 | 9.6 | 4.6 | 16.0 |
| C44 | 4.3 | 3.6 | 0.3 | 0.0 | 0.1 | 0.2 |
| C46 | 6.2 | 5.7 | 2.7 | 0.0 | 0.6 | 2.1 |
| C48 | 9.3 | 9.4 | 7.2 | 0.0 | 1.5 | 5.3 |
| C50 | 9.7 | 10.4 | 8.1 | 0.0 | 1.6 | 5.7 |
| C52 | 7.6 | 7.7 | 6.0 | 0.0 | 1.2 | 4.0 |
| C54 | 11.5 | 10.7 | 8.0 | 0.0 | 1.5 | 5.2 |
| C56 | 4.9 | 3.6 | 0.0 | 0.0 | 0.0 | 0.0 |
| C58 | 4.9 | 4.2 | 0.0 | 0.0 | 0.0 | 0.0 |
| C60 | 5.2 | 4.7 | 0.0 | 0.0 | 0.0 | 0.0 |
| C62 | 4.4 | 4.0 | 0.0 | 0.0 | 0.0 | 0.0 |
| C64 | 1.7 | 2.3 | 0.0 | 0.0 | 0.0 | 0.0 |
| C66 | 0.0 | 2.0 | 0.0 | 0.0 | 0.0 | 0.0 |
| Total | 100.0 | 100.2 | | | 12.4 | 43.4 | x = All fatty acids except Ca (C10:0)
/ = or

TABLE 14

Calculated results of example III of the amount of C22:0 which is bonded on a triglyceride molecule with L1 and/or L2.
75/25 wf(tuna)f/(BOO)s

| carbon number | Analyzed (wt %) | Calculated (wt %) | Be + x + L1/L2 (wt %) | Be + Be + L1/L2 (wt %) | Be wt % | wt % of the total added amount Be bonded on a molecule with L1 and/or L2 |
|---|---|---|---|---|---|---|
| C40 | 0.1 | 0.0 | 0.0 | 0.0 | 0.0 | 0.0 |
| C42 | 0.4 | 0.0 | 0.0 | 0.0 | 0.0 | 0.0 |
| C44 | 0.5 | 0.0 | 0.0 | 0.0 | 0.0 | 0.0 |
| C46 | 0.8 | 0.2 | 0.0 | 0.0 | 0.0 | 0.0 |
| C48 | 1.6 | 0.7 | 0.0 | 0.0 | 0.0 | 0.0 |
| C50 | 3.6 | 2.1 | 0.0 | 0.0 | 0.0 | 0.0 |
| C52 | 7.2 | 4.6 | 0.0 | 0.0 | 0.0 | 0.0 |
| C54 | 11.5 | 8.5 | 0.0 | 0.0 | 0.0 | 0.0 |
| C56 | 16.4 | 13.3 | 0.0 | 0.0 | 0.0 | 0.0 |
| C58 | 19.4 | 17.1 | 1.8 | 0.0 | 0.7 | 3.9 |
| C60 | 17.3 | 17.0 | 4.8 | 0.0 | 1.8 | 10.1 |
| C62 | 15.6 | 19.1 | 7.5 | 0.0 | 2.7 | 15.2 |
| C64 | 3.9 | 7.8 | 3.0 | 0.6 | 1.4 | 8.3 |
| C66 | 1.7 | 9.4 | 4.2 | 2.1 | 2.8 | 16.0 |
| Total | 100.0 | 99.8 | | | 9.3 | 53.4 | x = All fatty acids except Be (C22:0)
/ = or

TABLE 15

Analyzed results of example III of the amount of C2–C12 and or C20–C24 which is bonded on a triglyceride molecule with L1 and/or L2.

| | HPLC band | Band as % TAGs (g/100 g) | Sum of Cno's containing target TAG in band (% wt) | Sum of target acids in band (% wt) | Target acids in target TAGs in band (g/100 g) | Target acids in total FAME on TG (% wt) | Therefore target acids in target TAGs (% wt on total FAME) |
|---|---|---|---|---|---|---|---|
| in(TUNAf/ Butyrin) | A | 29.8 | 78.2 | 15.7 | 3.7 | 28.3 | 12.9 |
| | B | 32.0 | 62.3 | 4.6 | 0.9 | 28.3 | 3.2 |
| Total: | | | | | | | 16.2 |
| in(TUNAf/ BOOs) | A | 32.9 | 21.5 | 17.9 | 1.3 | 17.5 | 7.2 |
| | B | 42.0 | 16.8 | 8.3 | 0.6 | 17.5 | 3.3 |
| Total: | | | | | | | 10.6 |

TABLE 16

FAME results example IV

| FAME | D58 | in(D58/caprin) | in(D58/(BOO)s) |
|---|---|---|---|
| C10:0 | 0.0 | 29.1 | 0.0 |
| C12:0 | 0.0 | 0.1 | 0.0 |
| C12:other | 0.0 | 0.1 | 0.0 |
| C14:0 | 0.1 | 0.1 | 0.1 |
| C14:other | 0.5 | 0.3 | 0.3 |
| C16:0 | 0.1 | 0.3 | 0.7 |
| C16:1 | 1.0 | 0.9 | 0.7 |
| C16:other | 3.4 | 2.7 | 2.5 |
| C18:0 | 0.2 | 0.4 | 1.1 |
| C18:1 | 0.9 | 1.2 | 10.4 |
| C18:2 | 1.8 | 1.7 | 2.2 |
| C18:3 | 0.8 | 0.6 | 0.5 |
| C18:other | 3.5 | 2.4 | 2.2 |
| C20:0 | 0.0 | 0.1 | 1.1 |
| C20:1 | 0.1 | 0.1 | 0.1 |
| C20:2 | 0.0 | 0.0 | 0.0 |
| C20:3 | 0.4 | 0.4 | 0.4 |
| C20:4 | 4.6 | 3.3 | 3.3 |
| C20:5 | 16.1 | 10.8 | 10.4 |
| C20:other | 1.4 | 1.1 | 1.0 |
| C22:0 | 0.0 | 0.1 | 19.7 |
| C22:1 | 0.1 | 0.0 | 0.0 |
| C22:5 | 2.0 | 1.3 | 1.4 |
| C22:6 | 57.3 | 39.8 | 37.4 |
| C22:other | 5.6 | 3.5 | 4.1 |
| C24:0 | 0.0 | 0.0 | 0.4 |
| Total | 99.9 | 100.4 | 100.0 |

TABLE 17

Carbon number results example IV

| Carbon number | D58/caprin (blend) | in(D58/caprin) | D58/(BOO)s (blend) | in(D58/(BOO)s) |
|---|---|---|---|---|
| C30 | 43.0 | 10.4 | 0.0 | 0.0 |
| C32 | 0.5 | 0.7 | 0.0 | 0.0 |
| C34 | 0.5 | 1.6 | 0.0 | 0.0 |
| C36 | 0.4 | 2.2 | 0.0 | 0.0 |
| C38 | 0.1 | 2.9 | 0.0 | 0.8 |
| C40 | 0.2 | 9.3 | 0.3 | 1.8 |
| C42 | 0.2 | 19.4 | 1.0 | 3.5 |
| C44 | 0.7 | 2.3 | 0.8 | 3.3 |
| C46 | 0.7 | 2.9 | 1.1 | 3.8 |
| C48 | 0.5 | 5.0 | 1.0 | 2.2 |
| C50 | 1.3 | 7.5 | 1.7 | 2.2 |
| C52 | 0.9 | 10.6 | 1.5 | 2.4 |
| C54 | 2.3 | 14.0 | 2.6 | 4.2 |
| C56 | 4.1 | 1.4 | 5.9 | 7.8 |
| C58 | 7.3 | 1.8 | 17.0 | 11.7 |
| C60 | 9.9 | 2.8 | 15.8 | 16.6 |
| C62 | 12.2 | 3.1 | 39.0 | 19.0 |
| C64 | 9.0 | 2.1 | 7.9 | 10.6 |
| C66 | 6.2 | 0.0 | 4.4 | 10.1 |
| C68 | 0.0 | 0.0 | 0.0 | 0.0 |
| Total | 100.0 | 100.0 | 100.0 | 100.0 |

TABLE 18

Calculated results of example IV of the amount of C10:0 which is bonded on a triglyceride molecule with L1 and/or L2.
75/25 D58/tricaprin

| Carbon number | Analyzed (wt %) | Calculated (wt %) | Ca + x + L1/L2 (wt %) | Ca + Ca + L1/L2 (wt %) | Ca wt % | wt % of the total added amount Ca bonded on a molecule with L1 and/or L2 |
|---|---|---|---|---|---|---|
| C30 | 10.4 | 5.0 | 0.0 | 0.0 | 0.0 | 0.0 |
| C32 | 0.7 | 0.0 | 0.0 | 0.0 | 0.0 | 0.0 |
| C34 | 1.6 | 0.2 | 0.0 | 0.0 | 0.0 | 0.0 |
| C36 | 2.2 | 1.6 | 0.0 | 0.0 | 0.0 | 0.0 |
| C38 | 2.9 | 2.5 | 0.0 | 0.0 | 0.0 | 0.0 |
| C40 | 9.3 | 6.0 | 0.0 | 4.1 | 2.1 | 7.0 |
| C42 | 19.4 | 16.4 | 0.0 | 14.4 | 6.9 | 23.6 |
| C44 | 2.3 | 0.8 | 0.0 | 0.0 | 0.0 | 0.0 |
| C46 | 2.9 | 2.0 | 1.2 | 0.0 | 0.3 | 0.9 |
| C48 | 5.0 | 5.3 | 4.2 | 0.0 | 0.9 | 3.0 |
| C50 | 7.5 | 7.4 | 6.5 | 0.0 | 1.3 | 4.5 |
| C52 | 10.6 | 12.4 | 11.7 | 0.0 | 2.3 | 7.7 |
| C54 | 14.0 | 17.0 | 16.4 | 0.0 | 3.0 | 10.4 |
| C56 | 1.4 | 1.1 | 0.0 | 0.0 | 0.0 | 0.0 |
| C58 | 1.8 | 2.2 | 0.0 | 0.0 | 0.0 | 0.0 |
| C60 | 2.8 | 3.8 | 0.0 | 0.0 | 0.0 | 0.0 |
| C62 | 3.1 | 4.8 | 0.0 | 0.0 | 0.0 | 0.0 |
| C64 | 2.1 | 6.0 | 0.0 | 0.0 | 0.0 | 0.0 |
| C66 | 0.0 | 5.4 | 0.0 | 0.0 | 0.0 | 0.0 |
| Total | 100.0 | 99.9 | | | 16.6 | 57.1 | x = All fatty acids except Ca (C10:0)
/ = or

TABLE 19

Calculated results of example IV of the amount of C22:0 which is bonded on a triglyceride molecule with L1 and/or L2.
75/25 D58/(BOO)s

| Carbon number | Analyzed (wt %) | Calculated (wt %) | Be + x + L1/L2 (wt %) | Be + Be + L1/L2 (wt %) | Be wt % | wt % of the total added amount Be bonded on a molecule with L1 and/or L2 |
|---|---|---|---|---|---|---|
| C38 | 0.8 | 0.0 | 0.0 | 0.0 | 0.0 | 0.0 |
| C40 | 1.8 | 0.0 | 0.0 | 0.0 | 0.0 | 0.0 |

TABLE 19-continued

Calculated results of example IV of the amount of C22:0 which is bonded on a triglyceride molecule with L1 and/or L2.
75/25 D58/(BOO)s

| Carbon number | Analyzed (wt %) | Calculated (wt %) | Be + x + L1/L2 (wt %) | Be + Be + L1/L2 (wt %) | Be wt % | wt % of the total added amount Be bonded on a molecule with L1 and/or L2 |
|---|---|---|---|---|---|---|
| C42 | 3.5 | 0.0 | 0.0 | 0.0 | 0.0 | 0.0 |
| C44 | 3.3 | 0.0 | 0.0 | 0.0 | 0.0 | 0.0 |
| C46 | 3.8 | 0.0 | 0.0 | 0.0 | 0.0 | 0.0 |
| C48 | 2.2 | 0.0 | 0.0 | 0.0 | 0.0 | 0.0 |
| C50 | 2.2 | 0.2 | 0.0 | 0.0 | 0.0 | 0.0 |
| C52 | 2.4 | 0.7 | 0.0 | 0.0 | 0.0 | 0.0 |
| C54 | 4.2 | 2.1 | 0.0 | 0.0 | 0.0 | 0.0 |
| C56 | 7.8 | 5.1 | 0.0 | 0.0 | 0.0 | 0.0 |
| C58 | 11.7 | 10.4 | 0.6 | 0.0 | 0.2 | 1.3 |
| C60 | 16.6 | 16.1 | 2.8 | 0.0 | 1.0 | 5.9 |
| C62 | 19.0 | 24.4 | 6.2 | 0.0 | 2.2 | 12.6 |
| C64 | 10.6 | 18.5 | 8.1 | 1.1 | 3.5 | 20.2 |
| C66 | 10.1 | 22.2 | 9.6 | 3.8 | 5.7 | 32.8 |
| C68 | 0.0 | 0.0 | 0.0 | 0.0 | 0.0 | 0.0 |
| Total | 100.0 | 99.7 | | | 12.7 | 64.6 | x = All fatty acids except Be (C22:0)
/ = or

TABLE 20

FAME results of the interesterified mixtures used for the blends.
Fatty Acid Composition (wt %)

| | D40 | tributyrin/D40 | (BOO)s/D40 |
|---|---|---|---|
| C4:0 | 0.0 | 30 | 0 |
| C14:0 | 3.7 | 3 | 3 |
| C14unsat/C15 | 1.1 | 0 | 1 |
| C16:0 | 6.7 | 0 | 4 |
| C16:1 | 4.3 | 5 | 3 |
| C16unsat/C17 | 0.0 | 6 | 4 |
| C18:0 | 2.4 | 2 | 3 |
| C18:1 | 15.6 | 11 | 18 |
| C18:2 | 1.2 | 1 | 2 |
| C18:3 | 0.8 | 0 | 0 |
| C18:4 | 1.4 | 1 | 1 |
| Other C18 | 0.4 | 0 | 1 |
| C20:0 | 0.1 | 0 | 1 |
| C20:1 | 2.0 | 1 | 2 |
| C20:2 | 0.0 | 0 | 0 |
| C20:3 | 0.0 | 0 | 0 |
| C20:4 | 0.0 | 1 | 1 |
| C20:5 | 7.2 | 5 | 5 |
| Other C20 | 1.8 | 1 | 0 |
| C22:0 | 0.0 | 0 | 21 |
| C22:1 | 2.7 | 2 | 1 |
| C22:5 | 4.1 | 3 | 3 |
| C22:6 | 38.4 | 27 | 24 |
| Other C22 | 2.0 | 1 | 2 |

TABLE 21

Carbon number results of the interesterified mixtures used for the blends.

| Carbon Number | tributyrin/D40 | | (BOO)s/D40 | |
|---|---|---|---|---|
| | 0-time | 46 hours | 0-time | 46 hours |
| C12 | 30.0 | 7.7 | 0.0 | 0.0 |
| C20 | 0.0 | 0.1 | 0.0 | 0.0 |
| C22 | 0.0 | 2.0 | 0.0 | 0.0 |
| C24 | 0.0 | 7.4 | 0.0 | 0.0 |
| C26 | 0.0 | 8.0 | 0.0 | 0.0 |
| C28 | 0.0 | 6.2 | 0.0 | 0.0 |
| C30 | 0.0 | 13.1 | 0.0 | 0.0 |
| C32 | 0.0 | 1.2 | 0.0 | 0.0 |
| C34 | 0.0 | 1.2 | 0.0 | 0.0 |
| C36 | 0.0 | 1.6 | 0.0 | 0.0 |
| C38 | 0.0 | 3.3 | 0.0 | 0.0 |
| C40 | 0.0 | 5.6 | 0.0 | 0.0 |
| C42 | 0.3 | 6.5 | 0.3 | 0.4 |
| C44 | 1.9 | 9.4 | 0.7 | 1.6 |
| C46 | 2.0 | 5.9 | 2.6 | 2.0 |
| C48 | 1.6 | 8.8 | 2.4 | 1.7 |
| C50 | 2.8 | 1.7 | 3.4 | 3.5 |
| C52 | 5.1 | 1.1 | 5.8 | 5.7 |
| C54 | 9.3 | 1.6 | 8.8 | 10.3 |
| C56 | 9.9 | 1.6 | 11.6 | 13.9 |
| C58 | 11.8 | 2.0 | 17.6 | 17.7 |
| C60 | 11.2 | 2.0 | 13.7 | 14.9 |
| C62 | 9.2 | 1.6 | 27.0 | 18.2 |
| C64 | 2.7 | 0.3 | 4.2 | 5.2 |
| C66 | 2.2 | 0.0 | 1.9 | 4.5 |
| C68 | 0.0 | 0.0 | 0.0 | 0.4 |

TABLE 22a

N-values of the blends.

| Application | Blend | N-5 n.s. (%) | N-10 n.s. (%) | N-20 n.s. (%) | N-35 n.s. (%) |
|---|---|---|---|---|---|
| Chocolate | Typical values | 85–95 | 80–95 | 55–65 | <1 |
| | 99/1 CCB/ | 88.2 | 85.6 | 59.0 | 0.1 |

TABLE 22a-continued

N-values of the blends.

| Application | Blend | N-5 n.s. (%) | N-10 n.s. (%) | N-20 n.s. (%) | N-35 n.s. (%) |
|---|---|---|---|---|---|
| | in (D40/butyrin) 99/1 CCB/ in (D40/(BOO)s) | 89.3 | 85.9 | 59.5 | 0.0 |
| Bakery | Typical values | 40–80 | 30–75 | 20–45 | <15 |
| | 40/50/10 POf37/ dfPOf/in (D40/ butyrin) | 41.9 | 34.6 | 21.2 | 0.1 |
| | 40/50/10 POf37/ dfPOf/in (D40/ (BOO)s) | 42.2 | 37.3 | 23.4 | 0.4 |
| Ice cream coatings | Typical values | 65–90 | >35 | >15 | <1 |
| | 90/5/5 CN/CNs/ in (D40/butyrin) | 72.3 | 37.9 | 31.2 | 0.2 |
| | 90/5/5 CN/CNs/ in(D40/(BOO)s) | 74.7 | 61.7 | 34.2 | 0.0 |
| Ice cream | Typical values | 40–60 | | 15–30 | <5 |
| | 90/10 PO/in(D40/ butyrin) | 52.9 | | 21.4 | 3.6 |
| | 90/10 PO/in(D40/ (BOO)s) | 52.0 | | 20.8 | 3.9 |
| Non dairy creams | Typical values | 1–70 | | 0–37 | 0–11 |
| | 40/40/20 nPOm/ dfPOf/in (D40/ butyrin) | 50.1 | | 12.5 | 0.2 |
| | 40/40/20 nPOm/ dfPOf/in(D40/ (BOO)s) | 55.4 | | 10.6 | 0.0 |
| Health margarines/ Health spreads | Typical values | 7–20 | | 3–12 | <2.5 |
| | 13/77/10 HS1/SF/ in (D40/butyrin) | 14.7 | | 9.6 | 1.6 |
| | 13/77/10 HS1/SF/ in(D40/(BOO)s) | 17.7 | | 10.6 | 2.0 |
| Confectionery filling | Typical values | >50 | >40 | >25 | <1 |
| | 60/20/20 nPOm/ dfPOf/in (D40/ butyrin) | 65.8 | 58.3 | 31.8 | 0.1 |
| | 60/20/20 nPOm/ dfPOf/in(D40/ (BOO)s) | 69.5 | 61.7 | 31.3 | 0.4 |
| Mayonnaise/ Sauces | Typical values | 0–10 | 0–5 | <1 | <0.5 |
| | 90/10 SF/in(D40/ butyrin) | 0.0 | 0.0 | 0.0 | 0.0 |
| | 90/10 SF/in(D40/ (BOO)s) | 0.0 | 0.7 | 0.7 | 0.3 |
| Dressings | Typical values | 0–10 | 0–5 | <1 | <0.5 |
| | 90/10 SF/in(D40/ butyrin) | 0.0 | 0.0 | 0.0 | 0.0 |
| | 90/10 SF/in(D40/ (BOO)s) | 0.0 | 0.7 | 0.7 | 0.3 |

TABLE 23

Evaluation results of example VII

| OIL | VISCOSITY cP | SAUTER MEAN PARTICLE DIAMETER μM |
|---|---|---|
| Reference | 5940 | 19.30 |
| Sunflower oil/ in (D40/tributyrin) 90/10 | 5633 | 16.79 |
| Sunflower oil/ in(D40/(BOO)s) 90/10 | 5600 | 24.53 |

What is claimed is:

1. An interesterified triglyceride-composition, comprising at least two different long chain poly-unsaturated fatty acids $L_1$ and $L_2$, both of said different poly-unsaturated fatty acids having at least 3 unsaturations and having at least 20 carbon atoms from which $L_1$ is the most abundant and $L_2$ is the second most abundant, wherein the triglyceride composition contains at Least 30 wt % of $L_1$ the weight ratio $L_1$:$L_2$ is at least 3, and the triglyceride composition also contains an oxidative stabilizing amount of at least 2 wt % of saturated fatty acid with 2–12 or 20–24 carbon atoms or a combination of saturated fatty acids with 2–12 and 20–24 atoms, wherein the triglyceride composition does not contain more than 10 wt % of saturated fatty acids with 16–18 carbon atoms, and at least 5 wt % of the saturated $C_2$–$C_{12}$ or $C_{20}$–$C_{24}$ fatty acid residues is bonded on a triglyceride molecule, wherein at least $L_1$ and/or $L_2$ is present, said composition being characterized by its reduced or lack of odor or fish swell and off-taste.

2. Triglyceride composition according to claim 1, wherein the amount of $L_1$ is at least 40 wt %, the weight ratio of $L_1$:$L_2$ is at least 3.5 and the amount of $C_{16}$–$C_{18}$ saturated fatty acids is less than 8 wt %.

3. Triglyceride composition according to claim 1, wherein $L_1$ is dodecahexenoic acid and $L_2$ is eicosapentenoic acid.

4. Triglyceride composition according to claim 1, wherein $L_1$ is eicosapentenoic acid and $L_2$ is dodecahexenoic acid.

5. A blend of triglycerides comprising:

5–80 wt % of triglycerides according to claim 1, and

95–20 wt % of a complementary fat, having a solid fat index at 10° C. ($N_{10}$) that is either at least 5% more, or at least 5% less than $N_{10}$ of the triglyceride composition and wherein the complementary fat has a solid fat content (NMR-pulse; not stabilized) of more than 20 at 20° C.

6. A blend according to claim 5, wherein the complementary fat is selected from cocoa butter equivalents, cocoa butter, palm oil or fractions thereof, palmkernal oil or fractions thereof, interesterified mixtures of above fats or fractions or hardened components thereof, or from liquid oil, such as sunflower oil, high oleic sunflower oil, soybean oil, rapeseed oil, cottonseed oil, safflower oil, high oleic safflower oil, maize oil or MCT oils.

7. A blend according to claim 5, wherein the blend displays a solid fat content (NMR-pulse; not stabilized) of 0–85 at 5° C. and less than 30 at 35° C.

8. A blend according to claim 5, wherein the blend contains an effective amount of an oxidation stabilizer selected from the group consisting of natural and synthetic tocopherols, BHT, BHA, free radical scavengers, and enzymes with anti-oxidant properties.

9. A blend according to claim 5, comprising 20–70 wt % of the triglyceride composition and 80–30 wt % of the complementary fat, said blend displaying a solid fat content (NMR-pulse; not stabilized) of 20–60 at 5° C. and less than 5 at 35° C.

10. A food comprising a fat phase selected from the group consisting of spreads, margarine, cream alternatives, infant food, chocolate, confectionery, bakery products, sauces, ice creams, ice cream coatings, cheese, soups, mayonnaise, dressings, enteral or parental products, said fat phase including a triglyceride composition according to claim 1.

* * * * *